(12) United States Patent
Nakagawa et al.

(10) Patent No.: US 8,464,674 B2
(45) Date of Patent: Jun. 18, 2013

(54) CONTROL APPARATUS FOR VARIABLE OPERATION ANGLE MECHANISM

(75) Inventors: Takashi Nakagawa, Toyota (JP); Shunsuke Yamamoto, Toyota (JP); Shunsuke Habara, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/497,379

(22) PCT Filed: Mar. 11, 2011

(86) PCT No.: PCT/IB2011/000665
§ 371 (c)(1), (2), (4) Date: Mar. 21, 2012

(87) PCT Pub. No.: WO2011/121419
PCT Pub. Date: Oct. 6, 2011

(65) Prior Publication Data
US 2013/0008396 A1  Jan. 10, 2013

(30) Foreign Application Priority Data
Mar. 30, 2010  (JP) ................................ 2010-079109

(51) Int. Cl.
*F01L 1/34* (2006.01)

(52) U.S. Cl.
USPC .................... 123/90.16; 123/90.17; 701/103

(58) Field of Classification Search
USPC ........ 123/90.15, 90.17, 90.1, 90.16; 701/103, 701/110, 114
See application file for complete search history.

(56) References Cited

U.S. PATENT DOCUMENTS

| 5,924,395 | A | 7/1999 | Moriya et al. |
| 7,441,521 | B2* | 10/2008 | Asada et al. ............... 123/90.16 |
| 2003/0213451 | A1 | 11/2003 | Aoyama et al. |
| 2005/0229880 | A1 | 10/2005 | Hashizume |
| 2006/0048737 | A1 | 3/2006 | Yoshihara |

FOREIGN PATENT DOCUMENTS

| EP | 0 859 130 A1 | 8/1998 |
| EP | 1 363 002 A1 | 11/2003 |
| EP | 1 586 761 A2 | 10/2005 |
| JP | A-2004-36425 | 2/2004 |
| JP | A-2005-299594 | 10/2005 |

OTHER PUBLICATIONS

Aug. 2, 2011 Written Opinion of the International Searching Authority issued in International Patent Application No. PCT/IB2011/000665.

Aug. 2, 2011 International Search Report issued in International Patent Application No. PCT/IB2011/000665.

\* cited by examiner

*Primary Examiner* — Zelalem Eshete
(74) *Attorney, Agent, or Firm* — Oliff & Berridge, PLC

(57) ABSTRACT

An electronic control unit that controls a variable operation angle mechanism that varies an operation angle of an intake valve reduces an operation angle of the intake valve to a normal startup operation angle after first maintaining the operation angle of the intake valve at a high temperature restart operation angle that is larger than the normal startup operation angle for a predetermined period of time after an engine is stopped.

7 Claims, 7 Drawing Sheets

CONTROL APPARATUS FOR VARIABLE OPERATION ANGLE MECHANISM

BACKGROUND OF THE INVENTION

1. Field of the Invention

The invention relates to a control apparatus for a variable operation angle mechanism that varies the operation angle of an intake valve. More particularly, the invention relates to an improvement of a control structure when an engine is stopped that improves high temperature startability.

2. Description of the Related Art

Variable operation angle mechanisms that vary the operation angle of intake and exhaust valves are being used as mechanisms applied to engines in vehicles and the like. In many engines provided with such a variable operation angle mechanism, when the engine is stopped, the operation angle of the intake valve is set to an optimum operation angle to ensure startability the next time the engine is started. Japanese Patent Application Publication No. 2005-299594 (JP-A-2005-299594), for example, proposes technology that reduces the drive torque of a starter used for starting, thereby improving the startability of the engine, by increasing the operation angle of the intake valve and reducing the compression ratio in the cylinders when the engine is stopped.

Incidentally, in recent years, efforts have been made to increase the compression ratio of an engine in order improve fuel efficiency and the like. However, an engine with a high compression ratio is susceptible to knocking when the engine is restarted at a high temperature (hereinafter also referred to as a "high temperature restart"). Such knocking during a high temperature restart can be avoided by increasing the operation angle of the intake valve and reducing the compression ratio in the cylinders when the engine is stopped. Therefore, in the related art described above, knocking during a high temperature restart can be avoided by increasing the operation angle of the intake valve to the point at which knocking during a high temperature restart can be avoided, when the engine is stopped. However, if the operation angle of the intake valve is increased to the point at which knocking dining a high temperature restart can be avoided, the compression ratio may be too low for a normal start that is not a high temperature restart, and as a result, it may no longer be possible to ensure sufficient startability during a normal start.

SUMMARY OF THE INVENTION

The invention thus provides a control apparatus of a variable operation angle mechanism capable of ensuring good startability during a normal start that is not a high temperature restart, while also avoiding knocking during a high temperature restart.

A first aspect of the invention relates to a control apparatus of a variable operation angle mechanism that varies an operation angle of an intake valve. With this control apparatus, after an engine is stopped, the operation angle is maintained at a high temperature restart operation angle that is larger than a normal startup operation angle for a first predetermined period of time, after which the operation angle is reduced to the normal startup operation angle.

Also, in the control apparatus of this first aspect, the normal startup operation angle may be 200° CA and the high temperature restart operation angle may be 240° CA.

Also, in the control apparatus described above, the first predetermined period of time may be set to a period of time between a point in time when the engine is stopped and a point in time when an engine temperature has decreased to a temperature at which a high temperature restart will not be performed even if the engine is restarted.

With the structure described above, when the engine is stopped, the operation angle of the intake valve is set to the high temperature restart operation angle that is larger than the normal startup operation angle. Immediately after the engine stops, the temperature of the engine is high, and if the engine is restarted at that time, it will be a high temperature restart. However, in the structure described above at this time, the intake valve operation angle is significantly increased, which reduces the compression ratio in the cylinders, so knocking that accompanies a high temperature restart will be suppressed.

On the other hand, after a short time after the engine stops, the temperature of the engine will decrease so even if the engine is started, it will be a normal start, not a high temperature restart. Regarding this, with the structure described above, after the first predetermined period of time has passed after the engine stops, the intake valve operation angle is reduced to the normal startup operation angle, so the compression ratio in the cylinders will not drop too low during a normal start.

In this way, with this kind of structure, an appropriate operation angle can be set for both a high temperature restart and a normal start. Thus, this structure also makes it possible to ensure good startability during a normal start that is not a high temperature restart, while also avoiding knocking during a high temperature restart.

With the structure described above, the operation angle is reduced from the high temperature restart operation angle to the normal startup operation angle after the engine is stopped. When operating the variable operation angle mechanism after the engine is stopped, heat generation and operating noise of the actuator are issues. Incidentally, a somewhat large amount of torque is necessary to operate an actuator that is stopped, but once the actuator is started, it can be kept operating with little torque.

Therefore, in the control apparatus described above, when reducing the operation angle to the normal startup operation angle, a drive duty necessary to start operating an actuator of the variable operation angle mechanism may be applied to the actuator for a second predetermined period of time, after which a drive duty that is smaller than the drive duty necessary to start operating the actuator of the variable operation angle mechanism may be applied to the actuator until the operation angle comes to match the normal startup operation angle. By controlling the drive duty in this way, the current supplied to the actuator can be reduced to the smallest amount necessary, which makes it possible to better suppress heat generation and operating noise of the actuator.

Incidentally, there is variation in the operability of the actuator due to individual differences in the hardware. Therefore, the predetermined second period of time may be set longer for a lower operation speed of the actuator. With this structure, the intake valve operation angle is able to be more reliably reduced to the normal startup operation angle regardless of individual differences in the operability of the actuator.

Also, in the control apparatus described above, a target operating speed of the actuator of the variable operation angle mechanism when reducing the operation angle to the normal startup operation angle may be set, and the operating speed of the actuator may be feedback-controlled such that an actual operating speed of the actuator comes to match the target operating speed. In this case, the actuator can be operated as intended regardless of individual differences in the operability of the actuator.

Also, in the control apparatus described above, the normal startup operation angle may be able to be mechanically maintained even without operating the actuator of the variable operation angle mechanism, and the high temperature restart operation angle may be able to be maintained by operating the actuator. According to this structure, the operation of the actuator may be stopped after the first predetermined period of time has passed. This makes it possible to suppress the discharge of an onboard battery while the engine is stopped.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

A first example embodiment of the control apparatus of a variable operation angle mechanism of the invention will hereinafter be described in detail with reference to FIGS. 1 to 5.

Figure 1:
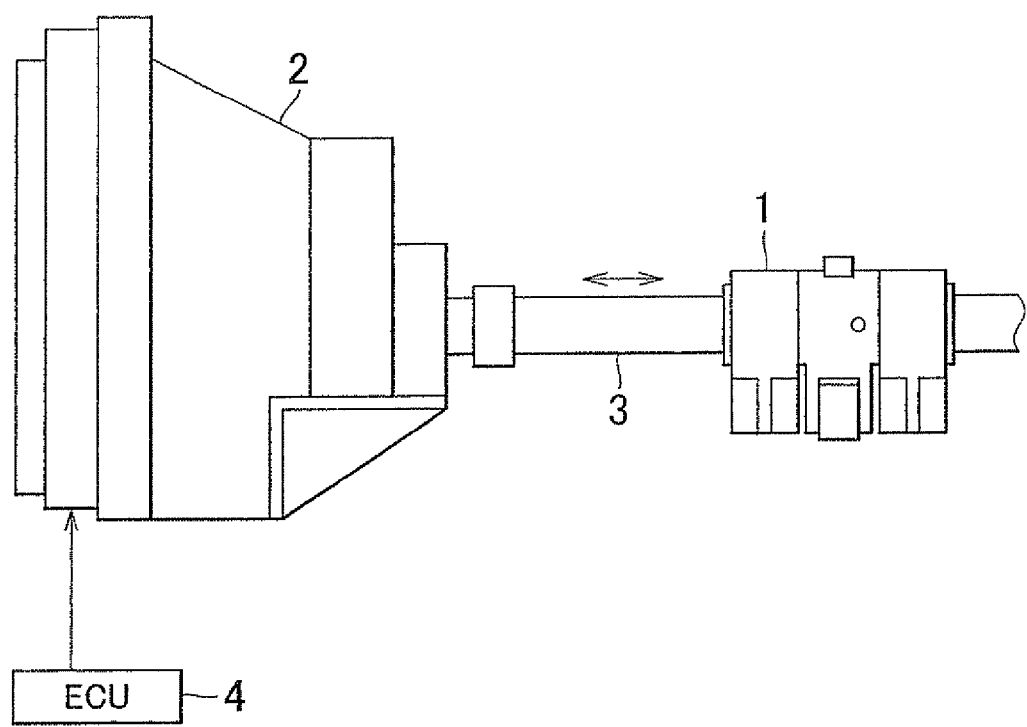
FIG. 1 is a schematic diagram showing a frame format of the overall structure of a first example embodiment of the invention.

FIG. 1 is a view of the overall structure of the first example embodiment. A variable operation angle mechanism 1 shown in FIG. 1 operates in response to a control shaft 3 being driven in the axial direction by an actuator 2. The operation angle of an intake valve changes in response to operation of the variable operation angle mechanism 1.

The actuator 2 is controlled by an electronic control unit (ECU) 4. The ECU 4 calculates a drive duty according to a difference between a target value and an actual value of the intake valve operation angle. The ECU 4 then operates the actuator 2 at the calculated drive duty. The value of the drive duty is set within a range of −100% to 100%, inclusive. When the value is negative, the actuator 2 is driven in a direction that reduces the intake valve operation angle. When the value is positive, the actuator 2 is driven in a direction that increases the intake valve operation angle. Also, the driving torque of the actuator 2 increases as the absolute value of the drive duty increases. Incidentally, the drive duty when the actuator 2 is driven normally while an engine is operating is guarded such that the value of the drive duty will fall within a range of −95% to 95%, inclusive.

Figure 2:
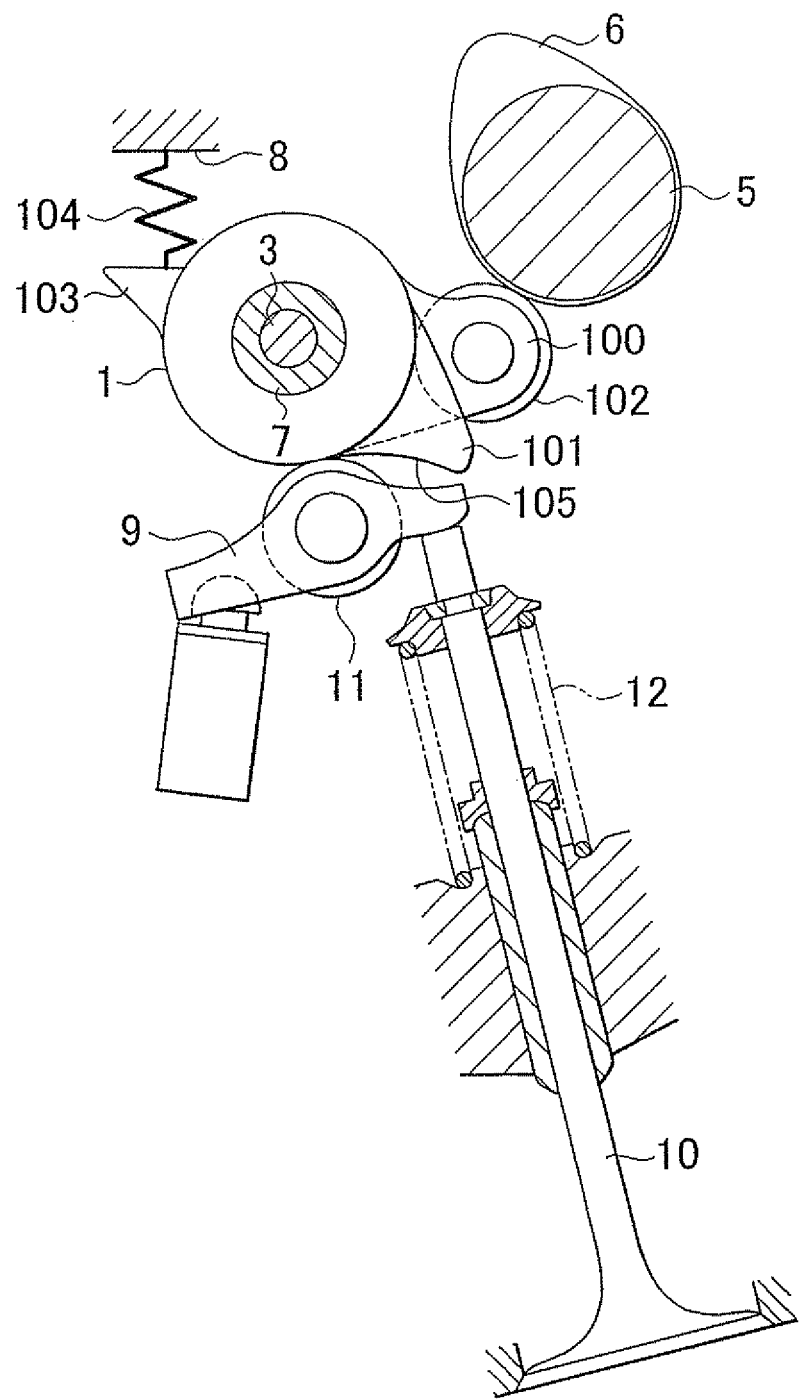
FIG. 2 is a sectional view of the structure of a valve system of an engine to which the control apparatus of the first example embodiment of the invention is applied.

FIG. 2 is a view of the structure of a valve system of an engine provided with this variable operation angle mechanism 1. As shown in FIG. 2, the variable operation angle mechanism 1 is arranged between a cam 6 that is provided on a cam shaft 5, and an intake valve 10. The variable operation angle mechanism 1 is rotatably supported so as to be able to rock on a pipe-shaped rocker shaft 7 arranged parallel to the cam shaft 5, and has an input arm 100 and a pair of output arms 101, one of which is arranged on each side of the input arm 100. Incidentally, the control shaft 3 described above is arranged so as to be able to slide in the axial direction inside the rocker shaft 7.

A roller 102 that abuts against the cam 6 is rotatably attached to the tip end of the input arm 100 of the variable operation angle mechanism 1. The input arm 100 rocks together with the output arms 101 around the axis of the rocker shaft 7 in response to being pushed down by the cam 6.

Incidentally, a protrusion 103 is formed on the outer periphery of the input arm 100. A lost motion spring 104 is arranged in a compressed state between this protrusion 103 and a spring seat 8 that is formed on a cylinder head of the engine. The lost motion spring 104 urges the variable operation angle mechanism 1 so that the roller 102 of the input arm 100 is pushed against the cam 6.

A roller rocker arm 9 is arranged below (in FIG. 2) each output arm 101 of the variable operation angle mechanism 1. Each roller rocker arm 9 is pivotally supported by the cylinder head of the engine at the base end, and abuts against the upper end of the intake valve 10 at the tip end. Also, a roller 11 is rotatably attached to each roller rocker arm 9. The roller 11 is pushed against a cam face 105 formed on the roller rocker arm 9 side of the tip end portion of the output arm 101 by the spring force of a valve spring 12 of the intake valve 10.

With this valve system, when the variable operation angle mechanism 1 pivots (i.e., rocks) by the cam 6 being pushed down by the rotation of the cam shaft 5, the cam face 105 of each output arm 101 pushes on the corresponding roller 11, and as a result, the roller rocker arm 9 pivots. As the roller rocker arm 9 pivots, the tip end portion of the roller rocker arm 9 pushes on the upper end of the intake valve 10, thereby driving the intake valve 10 open and closed. The contact point between the cam face 105 of the output arm 101 and the roller 11 of the roller rocker arm 9 at this time moves back and forth (i.e., reciprocates) along the cam face 105 as the output arm 101 pivots (i.e., rocks). The amount that the roller rocker arm 9 is pushed down by the cam face 105, and thus the lift amount of the intake valve 10, increases as the distance between the rocker shaft 7 and the contact point between the cam face 105 and the roller 11 increases.

Also, with this valve system, the relative positions of the tip end of the input arm 100 and the tip ends of the output arms 101 in the rocking direction of the variable operation angle mechanism 1 can be changed by displacing the control shaft 3 in the axial direction inside of the rocker shaft 7. The reciprocating range of the contact point between the cam face 105 and the roller 11 as the variable operation angle mechanism 1 pivots can be changed, and thus the maximum lift amount and the operation amount of the intake valve 10 can be changed, by changing the relative positions of the tips of the input arm 100 and the output arms 101 in this way.

More specifically, the reciprocating range of the contact point between the cam face 105 and the roller 11 is displaced toward the rocker shaft 7, which reduces the maximum lift amount and the operation angle of the intake valve 10, as the tip end of the input arm 100 and the tip ends of the output arms 101 become closer together in the rocking direction of the variable operation angle mechanism 1. Also, the reciprocating range of the contact point is displaced in a direction away from the rocker shaft 7, which increases the maximum lift amount and the operation angle of the intake valve 10, as the tip end of the input arm 100 and the tip ends of the output arms 101 become farther apart in the rocking direction of the variable operation angle mechanism 1.

Figure 3:
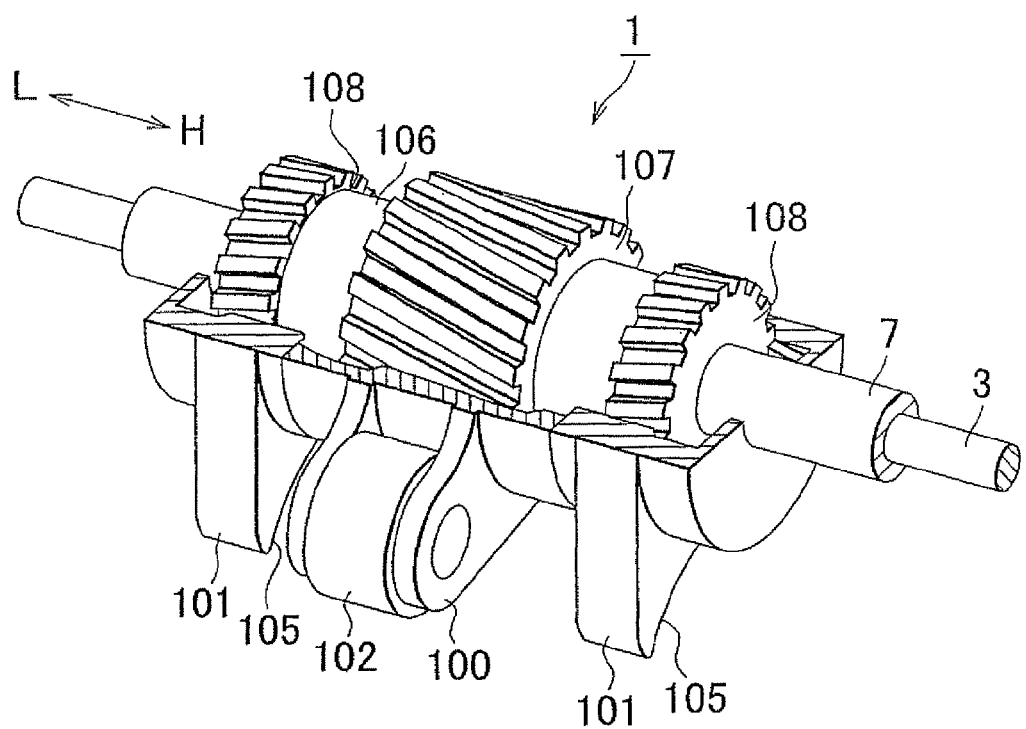
FIG. 3 is a perspective sectional view of the structure of a variable operation angle mechanism employed in the first example embodiment of the invention.

Next, the internal structure of the variable operation angle mechanism 1 will be described with reference to FIGS. 3 and 4. As shown in FIG. 3, a generally cylindrical slider 106 is arranged inside the input arm 100 and the output arms 101 of the variable operation angle mechanism 1. The slider 106 is integrated with the control shaft 3 and is able to move in the axial direction. An input gear 107 that has helical splines is fixed to the longitudinally center portion, on the outer periphery, of the slider 106, and an output gear 108 that has helical splines is fixed on each side, in the longitudinal direction, of the input gear 107 on the outer periphery of the slider 106.

Figure 4:
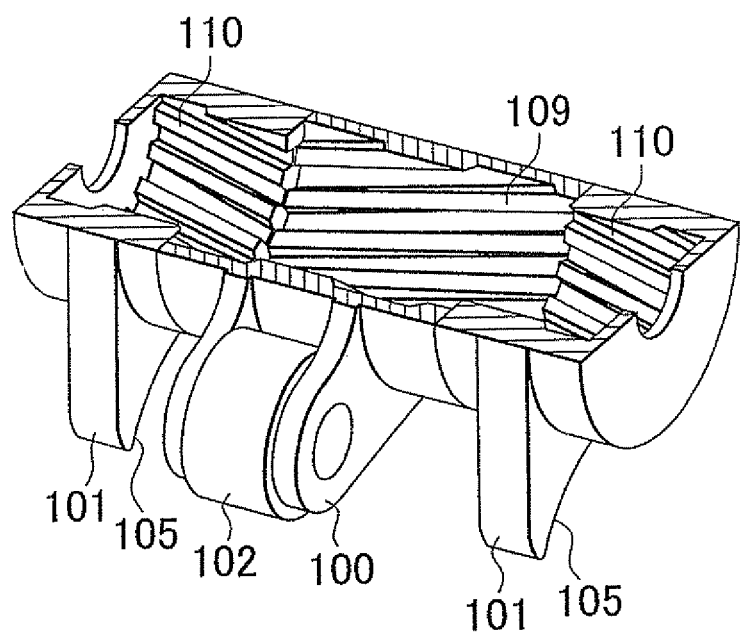
FIG. 4 is a perspective sectional view of the structure of an input arm and an output arm of the variable operation angle mechanism employed in the first example embodiment of the invention.

Meanwhile, as shown in FIG. 4, an annular gear with internal teeth 109 that has helical splines is formed on the inner periphery of the input arm 100, and an annular gear with internal teeth 110 that has helical splines is formed on the inner periphery of each of the output arms 101. The gear with internal teeth 109 of the input arm 100 is in mesh with the input gear 107 of the slider 106 (see FIG. 3), and the gears with internal teeth 110 of the output arms 101 are in mesh with the output gears 108 of the slider 106 (see FIG. 3). Incidentally, the helix angle of the helical splines of the input gear 107 and the gear with internal teeth 109 is different from the helix angle of the helical splines of the output gears 108 and the gear with internal teeth 110, and the orientations of those angles (i.e., the directions of inclination of the tooth traces) are opposite.

In this valve system, when the slider 106 is displaced in the axial direction by movement of the control shaft 3 in the axial direction, the relative positions of the tip end of the input arm 100 and the tip ends of the output arms 101 in the rocking direction of the variable operation angle mechanism 1 change due to the intermeshing of the input gear 107 and the gear with internal teeth 109, and the intermeshing of the output gears 108 and the gears with internal teeth 110. More specifically, the relative positions of the tip end of the input arm 100 and the tip ends of the output arms 101 in the rocking direction change so as to come closer together as the slider 106 is displaced in the direction of arrow L in FIG. 3, and become farther apart as the slider 106 is displaced in the direction of arrow H. The maximum lift amount and the operation angle of the intake valve 10 according to the rocking of the variable operation angle mechanism 1 by the rotation of the cam 6 are able to be varied by changing the relative positions in this way.

Then, in the example embodiment structured as described above, after the engine is stopped, the ECU 4 temporarily sets the intake valve operation angle to a high temperature restart operation angle (such as 240° CA) that is larger than a normal startup operation angle (such as 200° CA). The ECU 4 maintains this state for a predetermined period of time (i.e. a first predetermined period of time), and then reduces the intake valve operation angle to the normal startup operation angle.

Incidentally, in this example embodiment, the normal startup operation angle is an operation angle that can be mechanically maintained even without operating the actuator 2 of the variable operation angle mechanism 1. On the other hand, the high temperature restart operation angle is an operation angle that is only able to be maintained by operating the actuator 2. However, in this example embodiment, even though the actuator 2 needs to be operated for the period of time during which the high temperature restart operation angle is maintained after the engine is stopped, the actuator 2 does not need to be operated after the operation angle has been reduced to the normal startup operation angle.

Figure 5:
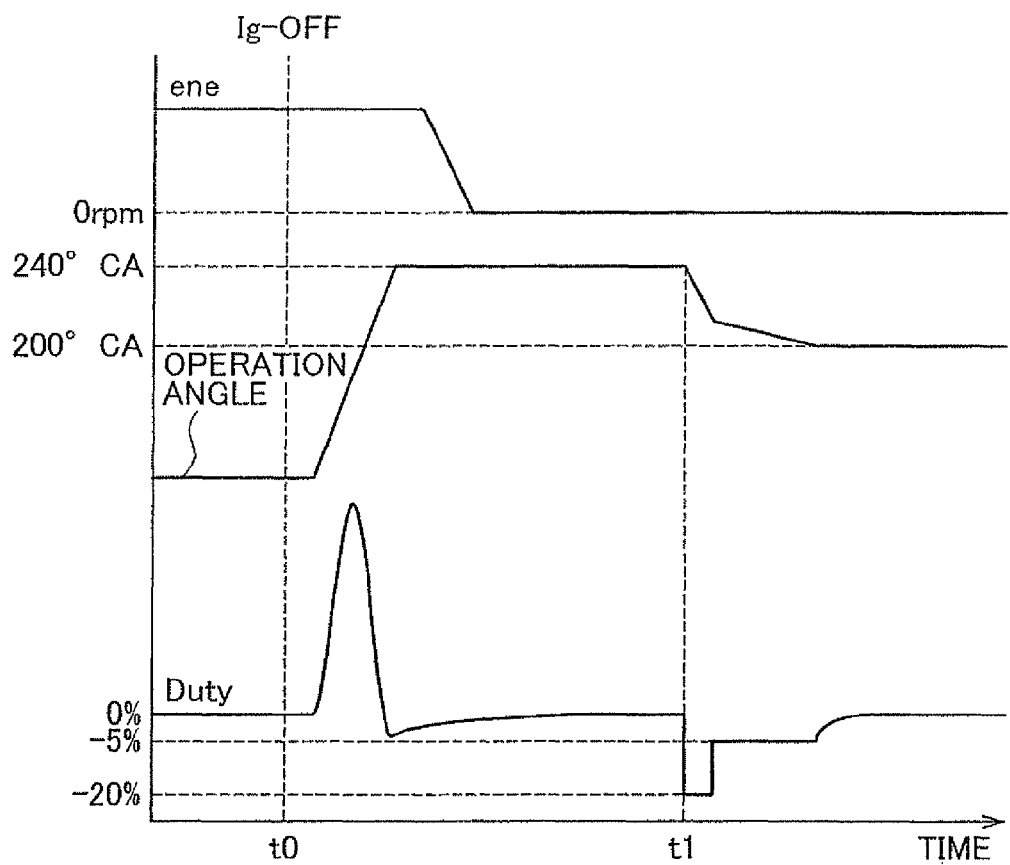
FIG. 5 is a time chart of an example of a control mode before and after engine stop according to the first example embodiment of the invention.

FIG. 5 is a view of a control mode before and after the engine is stopped (also simply referred to as "engine stop") in this example embodiment. More specifically, FIG. 5 shows changes in the engine speed ene, the intake valve operation angle, and the drive duty of the actuator 2, before and after engine stop.

After an ignition switch is turned off (Ig-OFF) at time t0 in FIG. 5, the actuator 2 is driven to increase the intake valve operation angle to the high temperature restart operation angle (240° CA). This state is maintained until time t1, at which time the engine temperature has decreased to a temperature at which, if the engine is restarted at this time, it will not be a high temperature restart. During this period, the intake valve operation angle is increased and the compression ratio of the engine is sufficiently reduced. Therefore, knocking will not occur even if the engine is restarted at a high temperature (i.e., even if a high temperature restart is performed) during this period.

Then at time t1 when the engine temperature has sufficiently decreased, the actuator 2 is driven to reduce the intake valve operation angle to the normal startup operation angle (200° CA). Incidentally, at this time the actuator 2 is driven after the engine is stopped, so the noise produced by the operation of the actuator 2, such as motor operation noise and gear operating noise, is an issue. Also, if the actuator 2 is locked at this time, a high current will flow, which may generate a large amount of heat. This is also an issue. Therefore, with this example embodiment, a restriction is placed on the drive duty of the actuator 2 at this time.

Incidentally, a somewhat large degree of torque is necessary to operate the actuator when it is stopped, but once it starts operating, operation of the actuator can be maintained with a small amount of torque. Therefore, in this example embodiment, when the operation angle is reduced to the normal startup operation angle, a drive duty (−20% in the example shown in FIG. 5) necessary to start operating the actuator 2 of the variable operation angle mechanism 1 is applied to the actuator 2 for a predetermined period of time (i.e., a second period of time). After this, the drive duty is reduced until the operation angle comes to match the normal startup operation angle (−7% in the example shown in FIG. 5), and this drive duty is then applied to the actuator 2.

More specifically, when all of conditions (a) to (c) described below are satisfied, the ECU 4 restricts the drive duty of the actuator 2 to within a range of −20% to 20%, inclusive. That is, a drive duty that just enables the generation of sufficient drive torque to start operating the actuator 2 is applied to the actuator 2 at this time. Here, condition (a) is that the engine speed be less than a predetermined value (such as 50 rpm). Condition (b) is that a command value of a guard switching counter, that will be described later, be less than a predetermined time (such as 200 milliseconds). Condition (c) is that at least one of the following conditions (i) or (ii) be satisfied. That is, condition (i) is that an actual stroke difference be equal to or greater than a predetermined value (such as 0.005 mm), and condition (ii) is that a target difference be equal to or greater than a predetermined value (such as 0.2 mm). At least one of these conditions must be satisfied for condition (c) to be satisfied.

Incidentally, the actual stroke difference here indicates an amount of change in the actual stroke (i.e., displacement in the axial direction) of the control shaft 3 in a unit of time. Also, the target difference indicates an amount of change in the target stroke of the control shaft 3 in a unit of time.

Meanwhile, the value of the guard switching counter is operated in the following manner. That is, the value of the guard switching counter is increased in increments of 1 for each predetermined control cycle when conditions (a) and (c) described above are both satisfied. Also, the value of the guard switching counter is cleared (i.e., reset to 0) when one or both of the conditions (a) and/or (b) is/are not satisfied.

Also, when at least one of conditions (d) or (e) below is satisfied, the ECU 4 restricts the drive duty of the actuator 2 to within a range of −5% to 5%, inclusive. That is, a drive duty that just enables the generation of sufficient drive torque for keeping the actuator 2 that has started to operate operating is applied to the actuator 2 at this time. First, condition (d) is that all of the following conditions (iii), (iv), and (v) be satisfied. Here, condition (iii) is that the condition (a) above be satisfied, condition (iv) is that the actual stroke difference be less than a predetermined value (such as 0.005 mm), and condition (v) is that the target difference be less than a predetermined value (such as 0.2 mm). Next, condition (e) is that the command value of the guard switching counter be equal to or greater than a predetermined time (such as 200 milliseconds).

The control apparatus of a variable operation angle mechanism of this example embodiment is able to yield the following effects. First, a first effect will be described. In this example embodiment, after the engine is stopped, the intake valve operation angle is maintained at a high temperature restart operation angle that is larger than the normal startup operation angle for a predetermined period of time, and then reduced to the normal startup operation angle. In this example embodiment, when the engine is stopped, the intake valve operation angle is set to the high temperature restart operation angle that is larger than the normal startup operation angle. Immediately after the engine stops, the temperature of the engine is high, and if the engine is restarted at that time, it will be a high temperature restart. However, in this example embodiment at this time, the intake valve operation angle is significantly increased, which reduces the compression ratio in the cylinders, so knocking that accompanies a high temperature restart will be suppressed. On the other hand, after a short time after the engine stops, the temperature of the engine will decrease so even if the engine is started, it will be a normal start, not a high temperature restart. Regarding this, in this example embodiment, after the predetermined period of time (i.e., the first predetermined period of time) has passed after the engine stops, the intake valve operation angle is reduced to the normal startup operation angle, so the compression ratio in the cylinders will not drop too low during a normal start. In this way, with this kind of structure, an appropriate operation angle can be set for both a high temperature restart and a normal start. Thus, this example embodiment also makes it possible to ensure good startability during a normal start that is not a high temperature restart, while also avoiding knocking during a high temperature restart.

Next, a second effect will be described. In this example embodiment, when reducing the operation angle to the normal startup operation angle, a drive duty necessary to start operating the actuator 2 is first applied to the actuator 2 for a predetermined period of time, and then the drive duty is reduced and applied to the actuator 2 until the operation angle comes to match the normal startup operation angle. In this example embodiment, the operation angle is reduced from the high temperature restart operation angle to the normal startup operation angle after the engine is stopped. When driving the variable operation angle mechanism after the engine is stopped, heat generation and operating noise of the actuator are issues. Incidentally, a somewhat large amount of torque is necessary to operate an actuator that is stopped, but once the actuator is started, it can be kept operating with little torque. Therefore, by controlling the drive duty as described above, the current supplied to the actuator 2 can be reduced to the smallest amount necessary, which makes it possible to better suppress heat generation and operating noise of the actuator 2.

Next, a third effect will be described. In this example embodiment, the normal startup operation angle is an operation angle that is able to be mechanically maintained even without operating the actuator 2 of the variable operation angle mechanism 1. On the other hand, the high temperature restart operation angle is an operation angle that is able to be maintained by operating the actuator 2. In this example embodiment, the operation of the actuator 2 may be stopped after a predetermined period of time has passed after the engine stops. This makes it possible to suppress the discharge of an onboard battery while the engine is stopped.

Next, a second example embodiment of the control apparatus of a variable operation angle mechanism of the invention will be described in detail with reference to FIG. 6. Incidentally, structure in this example embodiment that is common to structure in the first example embodiment will be denoted by like reference characters and detailed descriptions of the common structure will be omitted.

With the actuator 2 of the variable operation angle mechanism 1 described above, there is variation in the operability due to individual differences in the hardware. That is, there may be large differences in the drive torque necessary to start or maintain operation, depending on the individual actuator 2. Even in this case, controlling the actuator 2 in the following manner enables the operation angle to be appropriately changed from a high temperature restart operation angle to a normal startup operation angle after the engine is stopped.

In the first example embodiment, the actuator 2 is able to be started by applying a drive duty that just enables the generation of sufficient drive torque necessary to start operating the actuator 2 to the actuator 2 while the command value of the guard switching counter is less than the predetermined time. Naturally, with an actuator 2 having excellent operability, the actuator 2 can be started by applying a drive duty of a shorter period of time, and with an actuator 2 having poor operability, a drive duty of a longer period of time must be applied before the actuator 2 is started.

Therefore, with this example embodiment, the predetermined period of time is set longer for a lower operating speed of the actuator 2. More specifically, the slope of a change line of the actual stroke (i.e., the amount of change in the actual stroke per unit time) is detected, and the predetermined period of time is set longer for a smaller slope.

Figure 6:
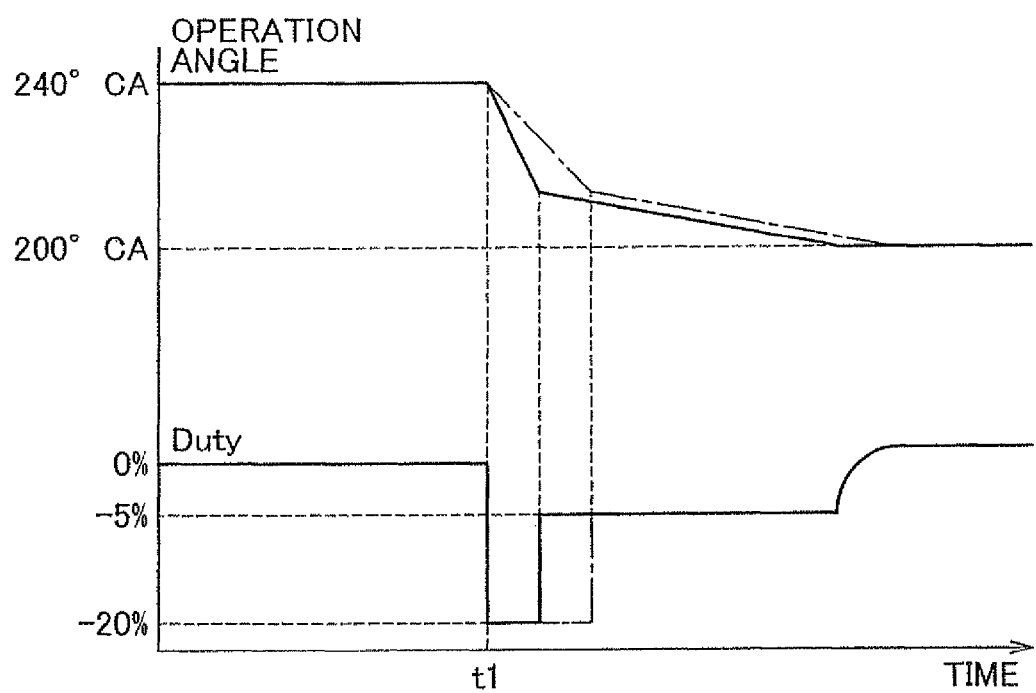
FIG. 6 is a time chart of an example of a control mode before and after engine stop according to a second example embodiment of the invention.

FIG. 6 is a view of a control mode before and after the engine is stopped in this example embodiment. More specifically, FIG. 6 shows a change in the intake valve operation angle and a change in the drive duty of the actuator 2 before and after the engine is stopped.

In FIG. 6, the intake valve operation angle is maintained at a high temperature restart operation angle (240° CA) until time t1, and then reduced to a normal startup operation angle (200° CA). Also, when driving the actuator 2 after time t1, a two stage drive duty restriction is applied. That is, immediately after time t1, a drive duty (−20%) that just enables the generation of sufficient drive torque necessary to start operating the actuator 2 is applied to the actuator 2 for a certain period of time. Then, after this, a drive duty (−5%) that just enables the generation of sufficient drive torque necessary to maintain operation of the actuator 2 that has been started is applied to the actuator 2.

Here, in this example embodiment, when the operability of the actuator 2 is high and the slope of the actual stroke after time t1 is comparatively large, as shown by the solid line in FIG. 6, the time for which the drive duty of −20% is applied is comparatively short. Also, when the operability of the actuator 2 is low and the slope of the actual stroke after time t1 is comparatively small, as shown by the broken line in FIG. 6, the time for which the drive duty of −20% is applied is comparatively long.

The example embodiment described above is able to yield a fourth effect in addition to the first to the third effects described above. This fourth effect will now be described. In this example embodiment, the time for which the drive duty (−20%) necessary to start operating the actuator 2 of the variable operation angle mechanism 1 is applied is set longer for a lower operating speed of the actuator 2. Therefore, the intake valve operation angle is able to be more reliably reduced to the normal startup operation angle regardless of individual differences in the operability of the actuator 2.

Next, a third example embodiment of the control apparatus of a variable operation angle mechanism of the invention will be described with reference to FIG. 7. Incidentally, structure in this example embodiment that is common to the example embodiments described above will be denoted by like reference characters and detailed descriptions of the structure will be omitted.

There are a variety of ways to deal with the generation of noise and heat that accompany the driving of the actuator 2 when reducing the operation angle from the high temperature restart operation angle to the normal startup operation angle as described above. For example, a target operating speed of the actuator 2 that enables problems with noise and heat generation to be avoided may be set, and noise and heat generation can be avoided by feedback-controlling the operating speed of the actuator 2 so that the actual operating speed comes to match the target operating speed.

Figure 7:
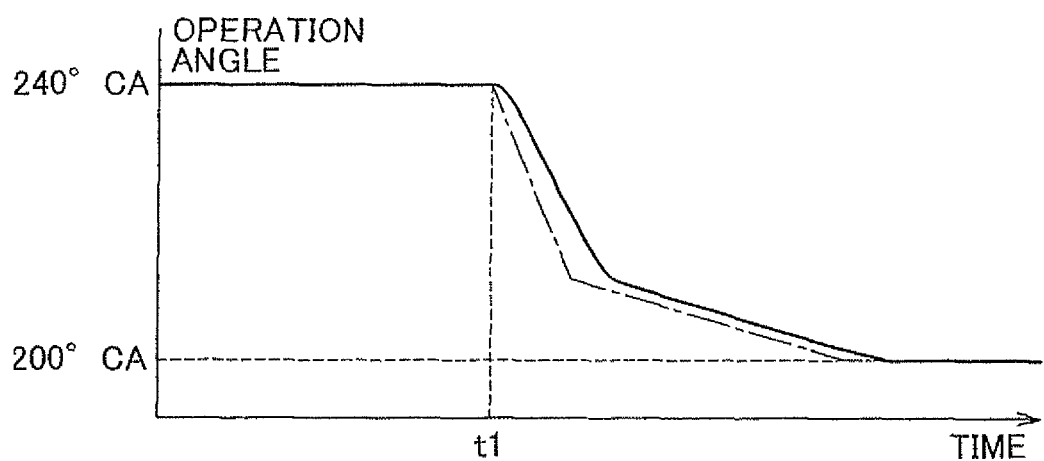
FIG. 7 is a time chart of an example of a control mode before and after engine stop according to a third example embodiment of the invention.

That is, in this example embodiment, the target operating speed of the actuator 2 after time t1 when the operation angle starts to be reduced from the high temperature restart operation angle to the normal startup operation angle is set as shown by the alternate long and short dash line in FIG. 7, and the actual operating speed of the actuator 2 is feedback-controlled to follow the set target operating speed. In this case, the actual operating speed of the actuator 2 can be changed as intended by sufficiently ensuring the responsiveness of the actuator 2. Therefore, the actuator 2 can be operated such that problems with noise and heat generation will not occur, by appropriately setting the target operating speed.

The example embodiment described above is able to yield a fifth effect in addition to the first to the third effects described above. This fifth effect will now be described. In this example embodiment, the target operating speed is set for the operation of the actuator 2 when reducing the operation angle from the high temperature restart to the normal startup operation angle. Then the operating speed of the actuator 2 is feedback-controlled so that the actual operating speed of the actuator 2 comes to match the target operating speed. In this example embodiment, the actuator 2 can be operated as intended regardless of individual differences in the operability of the actuator 2.

Incidentally, this example embodiment may also be modified as follows. For example, in the example embodiment described above, a two stage guard is applied to the drive duty of the actuator 2 when reducing the intake valve operation angle from the high temperature restart operation angle to the normal startup operation angle. Of course, if there is a need to set the guard more finely, the guard may also have three or more stages at this time. Also, if it is not necessary to set the guard finely, the guard at this time may have only one stage.

Also, in the example embodiment, the problems with noise and heat generation that accompany the driving of the actuator 2 while the engine is stopped are avoided by applying a guard that is tighter than a guard when driving the actuator 2 normally while the engine is operating to the drive duty of the actuator 2 when reducing the operation angle from the high temperature restart operation angle to the normal startup operation angle. Of course, if there are no problems with noise and heat generation, the guard of the drive duty when reducing the operation angle from the high temperature restart operation angle to the normal startup operation angle may also be set similar to the guard when driving the actuator 2 normally while the engine is operating.

Also, in the example embodiment described above, the normal startup operation angle is set at 200° CA and the high temperature restart operation angle is set at 240° CA. However, these operation angle values may be changed as appropriate according to the characteristics and the like of the engine to which the invention is applied.

Further, in the example embodiment described above, the normal startup operation angle is an operation angle that is able to be mechanically maintained even without operating the actuator 2, and the high temperature restart operation angle is an operation angle that is able to be maintained by operating the actuator 2. Of course, as long as there is sufficient power to discharge the onboard battery while the engine is stopped, the normal startup operation angle may also be set to an operation angle that can be maintained by operating the actuator 2.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A control apparatus of a variable operation angle mechanism that varies an operation angle of an intake valve, comprising: a control unit that, after the operation angle is maintained at a high temperature restart operation angle that is larger than a normal startup operation angle for a first predetermined period of time, after an engine is stopped, reduces the operation angle to the normal startup operation angle.

2. The control apparatus according to claim 1, wherein the normal startup operation angle is 200° CA and the high temperature restart operation angle is 240° CA.

3. The control apparatus according to claim 1, wherein the first predetermined period of time is set to a period of time between a point in time when the engine is stopped and a point in time when an engine temperature has decreased to a temperature at which a high temperature restart will not be performed even if the engine is restarted.

4. The control apparatus according to claim 1, wherein the control unit, when reducing the operation angle to the normal startup operation angle, after a drive duty necessary to start operating an actuator of the variable operation angle mechanism is applied to the actuator for a second predetermined period of time, apply a drive duty that is smaller than the drive duty necessary to start operating the actuator of the variable operation angle mechanism to the actuator until the operation angle comes to match the normal startup operation angle.

5. The control apparatus according to claim 4, wherein the second predetermined period of time is set longer for a lower operation speed of the actuator.

6. The control apparatus according to claim 1, wherein a target operating speed of the actuator of the variable operation angle mechanism when reducing the operation angle to the normal startup operation angle is set; and the control unit feedback-controls the operating speed of the actuator such that an actual operating speed of the actuator comes to match the target operating speed.

7. The control apparatus according to claim 1, wherein the normal startup operation angle is able to be mechanically maintained even without operating the actuator of the variable operation angle mechanism; and the high temperature restart operation angle is able to be maintained by operating the actuator.

* * * * *